(12) United States Patent
Hamada et al.

(10) Patent No.: US 6,184,627 B1
(45) Date of Patent: Feb. 6, 2001

(54) IMAGE DISPLAY

(75) Inventors: Kiyoshi Hamada; Michio Ohsugi; Hironari Taniguchi, all of Osaka (JP)

(73) Assignee: Matsushita Electronics Corporation, Osaka (JP)

(*) Notice: Under 35 U.S.C. 154(b), the term of this patent shall be extended for 0 days.

(21) Appl. No.: 09/367,582

(22) PCT Filed: Dec. 17, 1998

(86) PCT No.: PCT/JP98/05731

§ 371 Date: Aug. 17, 1999

§ 102(e) Date: Aug. 17, 1999

(87) PCT Pub. No.: WO99/34606

PCT Pub. Date: Jul. 8, 1999

(30) Foreign Application Priority Data

Dec. 24, 1997 (JP) ................................................ 9-355383

(51) Int. Cl.⁷ .................................................. G09G 3/10
(52) U.S. Cl. ................................ 315/169.4; 315/169.2; 315/387; 345/48; 313/496
(58) Field of Search ........................... 315/111.81, 111.21, 315/111.31, 111.71, 169.4, 169.3, 169.2, 382, 387, 388, 389; 345/55, 84, 87, 103, 74, 38, 33, 48; 313/492, 494, 498, 500, 505, 496

(56) References Cited

U.S. PATENT DOCUMENTS 4,077,054 * 2/1978 Endriz .................................. 358/242
4,451,846 * 5/1984 Iyehara et al. ......................... 358/56
6,031,328 * 2/2000 Nakamoto ............................ 313/495

FOREIGN PATENT DOCUMENTS

| 079604 | * 5/1983 | (EP) . |
| 60-191578 | 9/1985 | (JP) . |
| 1-069188 | 3/1989 | (JP) . |
| 1-173553 | 7/1989 | (JP) . |
| 1-296543 | 11/1989 | (JP) . |
| 4-068791 | 3/1992 | (JP) . |

* cited by examiner

*Primary Examiner*—Don Wong
*Assistant Examiner*—Ephrem Alemu
(74) *Attorney, Agent, or Firm*—Merchant & Gould, P.C.

(57) ABSTRACT

An image display device has a plurality of electrodes that control a beam between a group of linear cathodes (2) and a screen (8) with a phosphor layer, and is provided with a circuit (31) for generating a beam track offset signal, which generates a signal for slightly oscillating one of the beams horizontally, a PIN photodiode (33) for detecting the emission amount of the phosphor layer for this beam, a comparator (35) for generating a beam irradiation position misalignment signal based on the detected emission amount, an integrating circuit (36) for generating a beam position control signal in correspondence with the beam irradiation position misalignment signal; and a horizontal deflection electrode driving circuit (39) for driving a horizontal deflection electrode (6) in accordance with the beam position control signal. With this configuration, misalignments of the position of the beam spot and the phosphor stripes on the screen, which are caused for various reasons, can be suppressed, and an image display device is obtained, in which a deterioration of the image quality, such as color misalignments, does not occur.

6 Claims, 7 Drawing Sheets

Pa (emission of La) ⟩ Pb (emission of Lb)

IMAGE DISPLAY

TECHNICAL FIELD

The present invention relates to an image display device used in color television receivers and terminal displays for computers, etc.

BACKGROUND ART

FIG. 6 is a schematic exploded perspective view of a conventional image display device. In this conventional image display device, a rear electrode 1, a group of linear cathodes 2 serving as a beam source, a beam extraction electrode 3, a control electrode 4, a focusing electrode 5, a horizontal deflection electrode 6, a vertical deflection electrode 7, and a screen 8 are arranged in this order from the rear towards the anode, and are stored inside a vacuum container (not shown in the drawings).

The group of linear cathodes 2 serving as a beam source is made by extending a plurality of linear cathodes horizontally, so as to generate electron beams that are distributed linearly in a horizontal direction. A plurality of these cathodes is arranged at predetermined intervals in a vertical direction. In this conventional image display device, the intervals between the linear cathodes in the vertical direction are 5.5 mm, with a number of 19 cathodes denoted 2a to 2s. However, in order to avoid making FIG. 6 too complicated, only four linear cathodes from 2a to 2d are shown. The linear cathode 2a to 2s are made by applying an oxide cathode material to the surface of a tungsten wire with a diameter of 10–30 $\mu$m, for example. These linear cathodes are then operated for a constant time in sequence from the upper linear cathode 2a to the lower linear cathode 2s, so that each cathode emits an electron beam every 18 horizontal scanning periods.

In addition to prevent the generation of electron beams from linear cathodes other than predetermined linear cathodes, the rear electrode 1 also has the function to ensure that electron beams are emitted only in the direction of the anode. The vacuum container is not shown in FIG. 6, but depending on the circumstances, the rear electrode 1 can be taken and formed in one piece with the vacuum container.

The beam extraction electrode 3 is made of a conductive board 11 provided with a plurality of through holes 10 and has the function to divide and select a plurality of electron beams emitted from the group 2 of linear cathodes horizontally via the through holes 10. On the beam extraction electrode 3, the through holes 10 are arranged on the conductive board 11 with constant horizontal pitch, in opposition to the linear cathodes 2a to 2s. In this conventional image display device, the horizontal pitch of the through holes 10 is 1.28 mm and there are 107 through holes 10 in the horizontal direction.

The control electrode 4 is made of 107 long vertical conductive boards 15, which have through holes 14 that are positioned in opposition to the through holes 10 of the beam extraction electrode 3. However, in order to avoid making FIG. 6 too complicated, only nine conductive boards 15 are shown. Furthermore, based on the image signal for each section, the control electrode 4 simultaneously modulates the throughput of the electron beams that are divided into 107 horizontal sections.

Each section is divided into two pixels, and as each pixel has three primary colors (phosphors) of R (red), G (green), and B (blue), the six signals of 2 (pixels)×3 (primary colors) that correspond to each section are synchronized with the horizontal deflection, described later, and are then added one after another in time division (within one horizontal scanning period).

The focusing electrode 5 is made of a conductive board 17 that has a plurality of through holes 16, which have the function to focus the electron beam. The through holes 16 in this conductive board 17 are formed in positions opposing the through holes 14 formed in the control electrode 4.

The horizontal deflection electrode 6 is made of a pair of a comb-shaped conductive boards 18 and 18' arranged vertically along both horizontal sides of the through holes 16 formed in the focusing electrode 5, and its function is to simultaneously deflect the electron beam that is divided into 107 sections in a horizontal direction, so that the two groups of the primary color phosphor stripes R, G, and B on the screen 8, which will be described later, are irradiated successively in six stages and emit light.

The vertical deflection electrode 7 is made of a pair of comb-shaped conductive boards 19 and 19' arranged horizontally, in the space between vertically neighboring through holes 16 formed on the focusing electrode 5. With these two conductive boards 19 and 19', the voltage for vertical deflection is applied, and the vertical deflection electrode 7 deflects the electron beam vertically. Here, the vertical deflection electrode 7 deflects the electron beam which is emitted by the 19 linear cathodes 2a to 2s in 12 stages each, or in other words, 12 horizontal scanning line segments each, and 228 horizontal scanning lines are drawn in a vertical direction on the screen 8.

In this conventional image display device as described above, the horizontal deflection electrode 6 and the vertical deflection electrode 7 are both comb-shaped and spread out. Since the distance to the screen 8 is longer than the distance between the horizontal and vertical deflection electrodes, the electron beam can be irradiated onto arbitrary positions of the screen 8 with small amounts of deflection. Therefore, with this configuration, it is possible to decrease the distortion for both horizontal and vertical deflection.

The screen 8 is made of a glass pane, and the R,G and B primary color phosphors which emit light due to irradiation with the electron beam are applied in a stripe-like shape separated by black guard bands (black matrix) onto the rear side of this glass pane, with a metal backing arranged on top (not shown in the drawings). In FIG. 6, the broken lines drawn on the screen 8 show the vertical sections, displayed in correspondence to the plurality of linear cathodes 2a to 2s. Further, the alternate-long-and-two-short dash lines indicate the horizontal sections displayed in correspondence to the plurality of conductive boards 15, which make up the control electrode 4.

In one section, partitioned by both (the broken lines and the alternate long and two short dash lines), as shown enlarged in FIG. 7, two groups of primary color phosphor stripes 20 R, 20 G and 20 B of R, G and B are applied vertically in stripe-like shapes, separated by black guard bands 22 in the horizontal direction. The horizontal lines are formed for 12 lines in the vertical direction. The size of one section (1 unit) in this conventional example is 1.0 mm horizontally, and 4.4 mm vertically, but for illustrative reasons, the lengthwise and crosswise proportions in FIG. 7 are different from the image that appears on the actual screen.

However, in this conventional image display device above, due to thermal expansion of the structural elements when operating the image display device, misalignments between the screen and a group of flat electrodes occur, and due to environmental magnetic fields (for example the earth's magnetism at that position) deviations of the beam track between the group of flat electrodes and the screen occur, causing misalignments between the beam spot and the phosphor stripes on the screen, resulting in a deterioration of the image quality, such as color misalignments, etc.

DISCLOSURE OF INVENTION

It is an object of this invention to solve the above-mentioned problems, and to provide an image display device, wherein misalignments of the beam spot position with respect to the phosphor stripes on the screen, which are caused for various reasons, are eliminated, and image deterioration, such as color misalignments, does not occur, which is achieved by detecting the relative position of the beam spot with respect to the phosphor stripes, and performing a correction based on the detected value.

An image display device in accordance with the present invention that achieves these objects includes an emission source for electron beams; a display screen having a phosphor layer, wherein phosphors are formed in a certain pattern and separated by a black matrix; an electron beam track controlling system, the system having the function of selectively irradiating the electron beams onto predetermined positions of the phosphor layer, and is characterized in that it includes a system for oscillating a predetermined one of the electron beams; a system for detecting an emission amount at a predetermined position of the phosphor layer generated by the oscillating electron beam; a system for recognizing a misalignment of the electron beams based on the emission amount; and a system for correcting misalignment of the electron beams by feedback of the misalignment to the electron beam track controlling system.

With the image display device of this invention, these electron beam misalignments can be eliminated by making it possible to recognize these electron beam misalignments by oscillating one of the electron beams, which is irradiated onto the phosphor layer, and detecting an emission amount at a predetermined position of the phosphor layer emitted by this oscillating electron beam, and correcting the misalignments by feeding them back into the beam track controlling system. Thus, with the image display device of the present invention, misalignments between a group of flat electrodes and the screen, caused by thermal expansion of structural elements during operation, or misalignments between beam spot positions with respect to phosphor stripes on the screen, caused by deviations of the beam track between the group of flat electrodes and the screen due to ambient magnetic fields (for example the earth's magnetism at that location), which have been a problem in the prior art, can be prevented. As a result, a deterioration of the image quality, such as color misalignments caused by such misalignments, can be eliminated.

In the image display device according to the present invention, it is preferable that the system for recognizing a misalignment of the electron beams compares (i) an emission amount of the phosphor layer at a position that is defined by applying a certain offset to a beam track, which shifts the beam track with respect to a center of the phosphor layer at a certain position, with (ii) an emission amount of the phosphor layer at a position that is defined by applying another offset that is opposite to the certain offset of the beam track with respect to the center of the phosphor layer.

In the image display device according to the present invention, it is also preferable that the system for recognizing a misalignment of an electron beam compares (i) an emission amount of the phosphor layer at a position that is defined by applying a certain offset to a beam track, which shifts the beam track with respect to a center of the phosphor layer at a certain position, with (ii) an appropriate emission amount of the phosphor layer at that position.

In the image display device according to the present invention, it is preferable that the system for detecting the emission amount of the phosphor layer uses a PIN photodiode.

BEST MODE FOR CARRYING OUT THE INVENTION

The following is an explanation of an embodiment of this invention with reference to the accompanying drawings.

Figure 1:
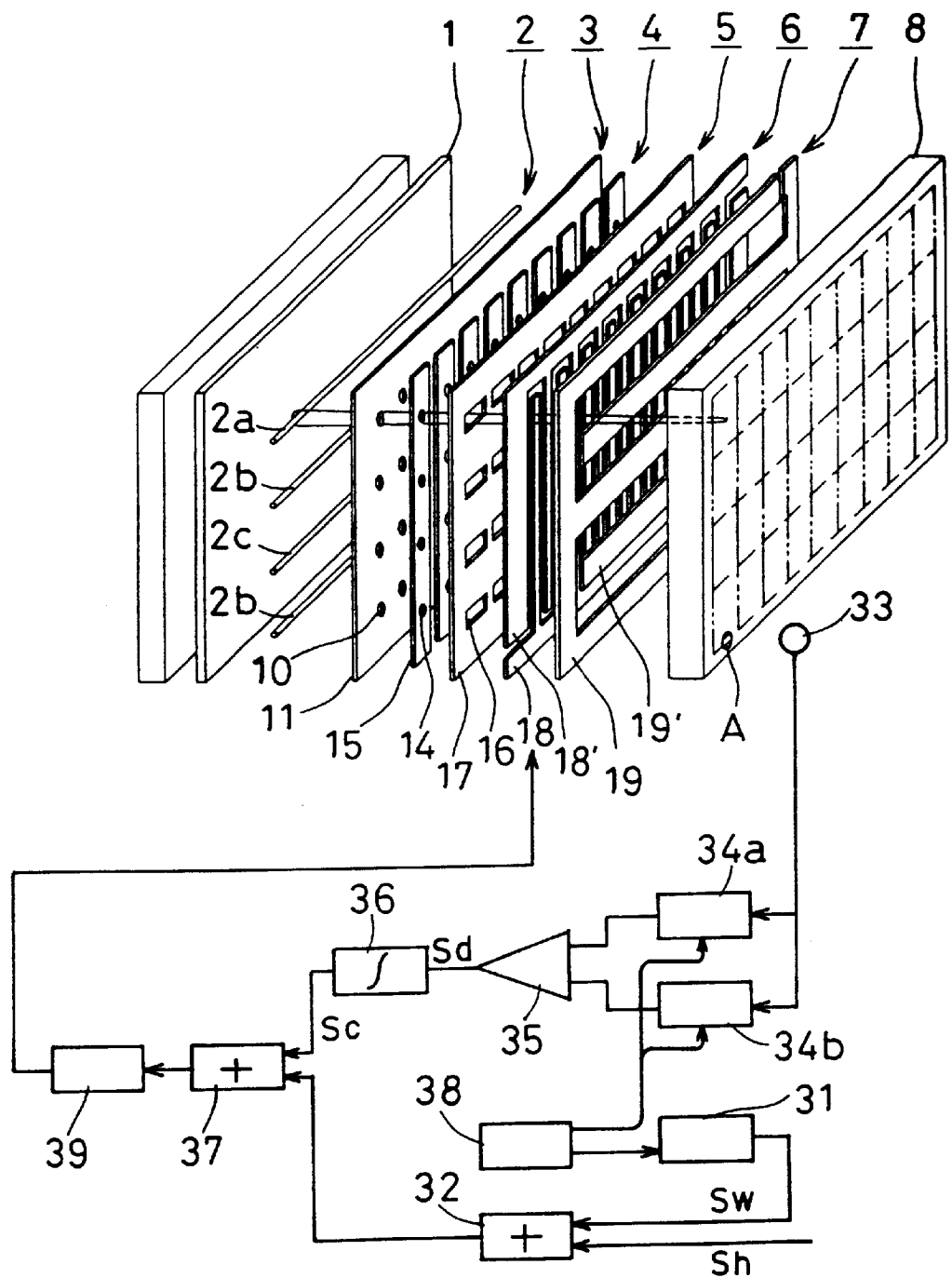
FIG. 1 is a diagram of an image display device according to an embodiment of this invention.

FIG. 1 shows an exploded perspective view of the general configuration of an image display device according to an embodiment of this invention, the place where a detecting portion for detecting the beam irradiation position is installed in this image display device, and a block diagram of a feedback loop that controls the beam track according to the beam irradiation position at this installation place. Further, FIGS. 2 to 4 are drawings illustrating the principle of detecting the beam irradiation position in the image display device shown in FIG. 1, in particular showing a partial magnification of the image display area.

Figure 6:
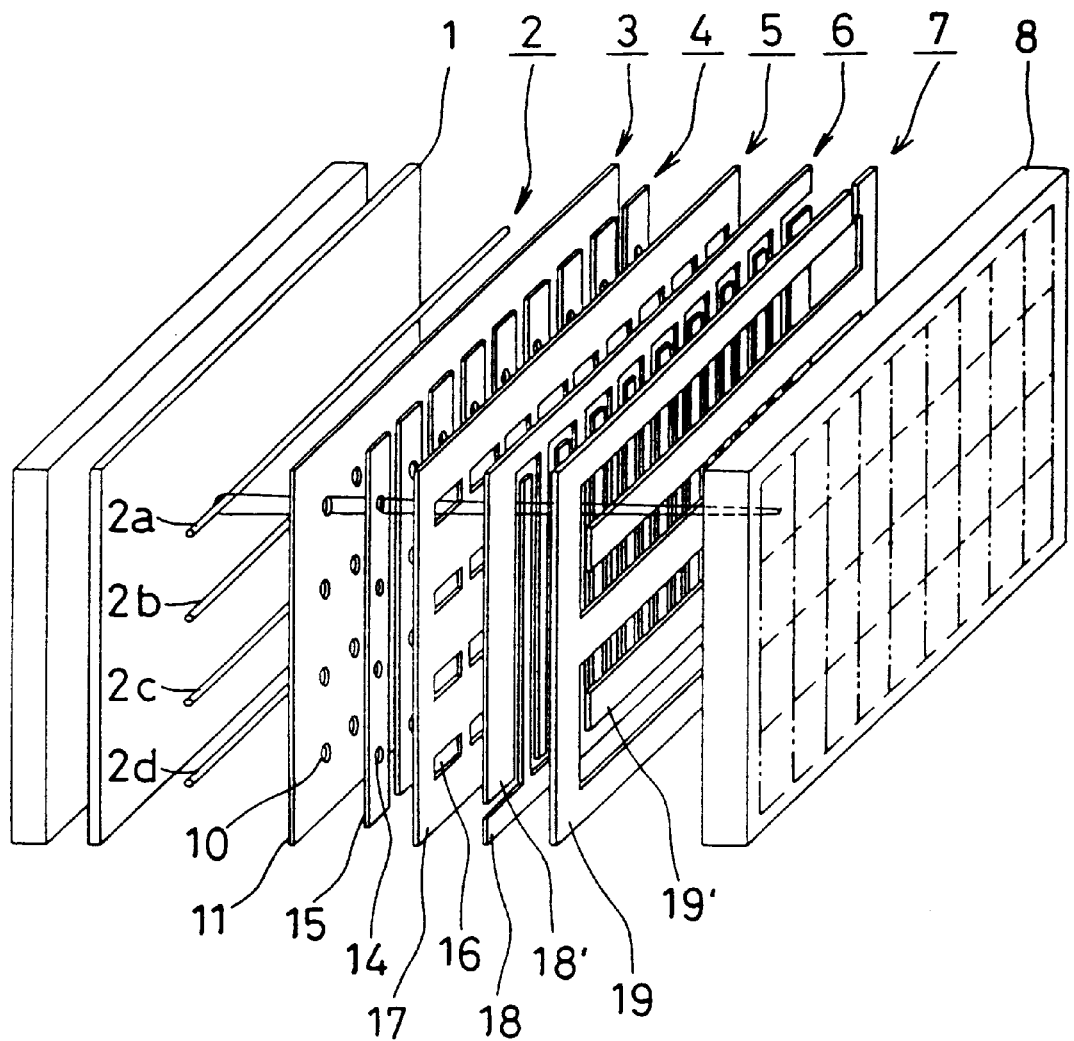
FIG. 6 is an exploded perspective view of a conventional image display device.
Figure 7:
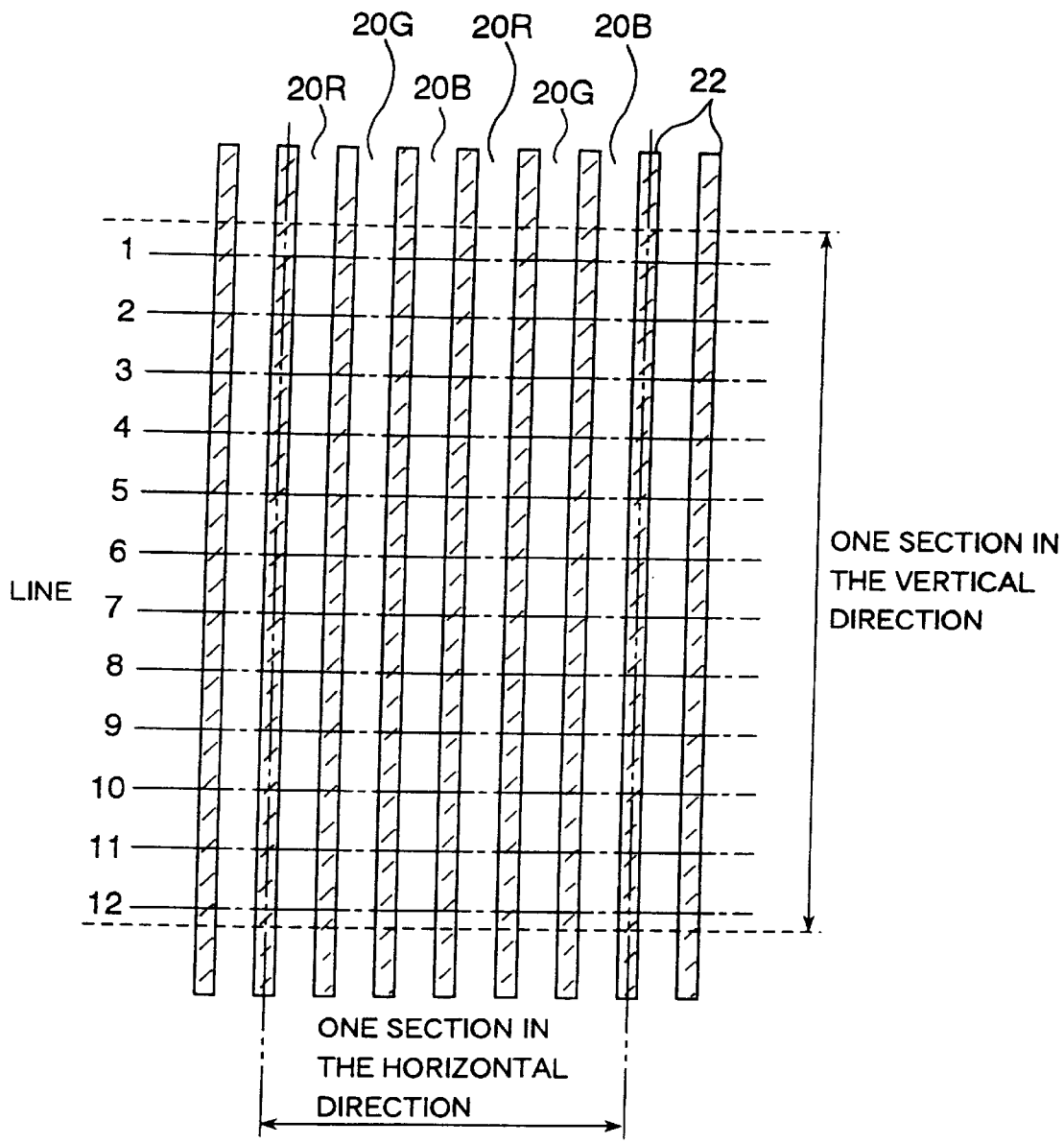
FIG. 7 is a magnification of one section of the phosphors on the screen of the image display device shown in FIG. 6.

The image display device according to this embodiment shown in the drawings from FIG. 1 to FIG. 4 (configuration of electrodes, screen, etc.) has basically the same configuration as a conventional image display device (see FIG. 6). However, the image display device of this embodiment differs from a conventional image display device in that it has a configuration that eliminates misalignments of the beam spot position with respect to the phosphor stripes on the screen, which occur for various reasons.

Area A in FIG. 1 indicates the detecting portion for detecting the beam irradiation position. In this embodiment, the lower left corner (area A) of the image display area of the screen 8 is the detecting portion for detecting the beam irradiation position, and the beam that is irradiated here is the beam for detecting the beam irradiation position. As will be explained below in detail, an offset, whose polarity is reversed for each field, is applied to the beam track. This offset shifts the beam for detecting the beam irradiation position by equal small amounts to the left and right with respect to the center of the phosphor stripe, which is located at the previous irradiation position of the beam.

Figure 2:
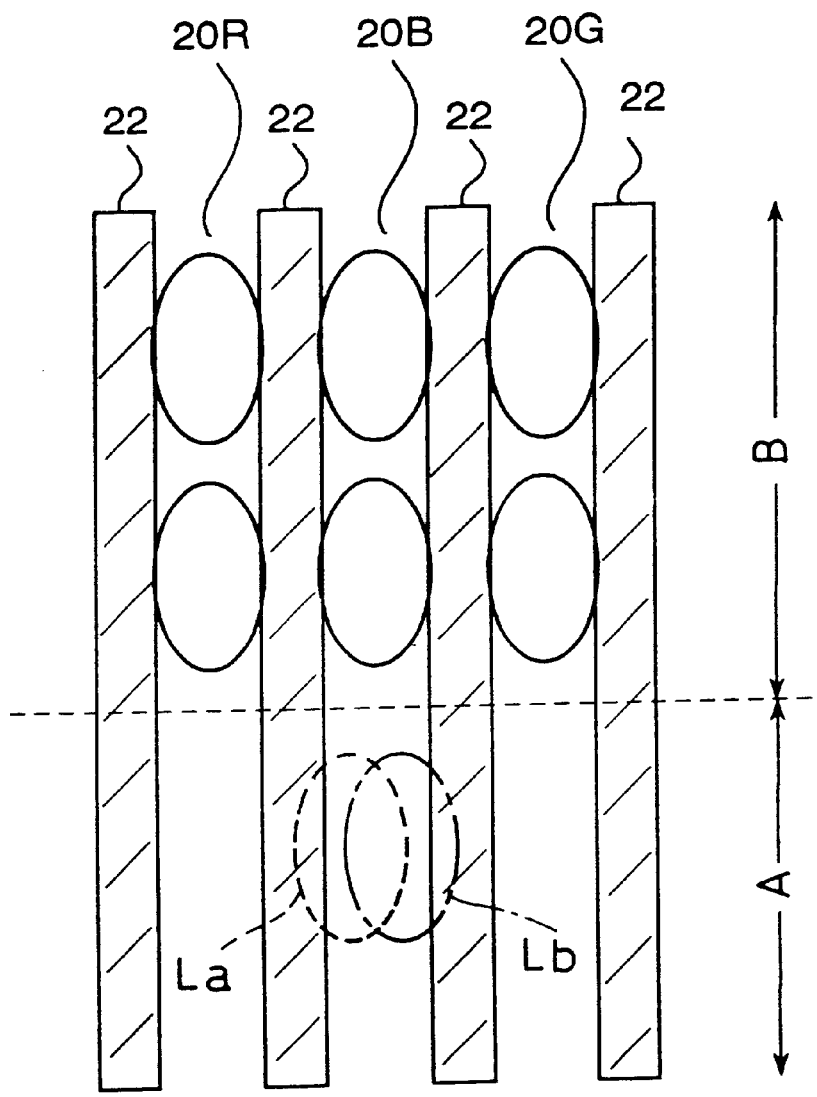
FIG. 2 is a drawing explaining the principle of detecting the beam irradiation position (when there is no misalignment in the beam irradiation position on the phosphor stripes) in the image display device according to an embodiment of this invention.
Figure 3:
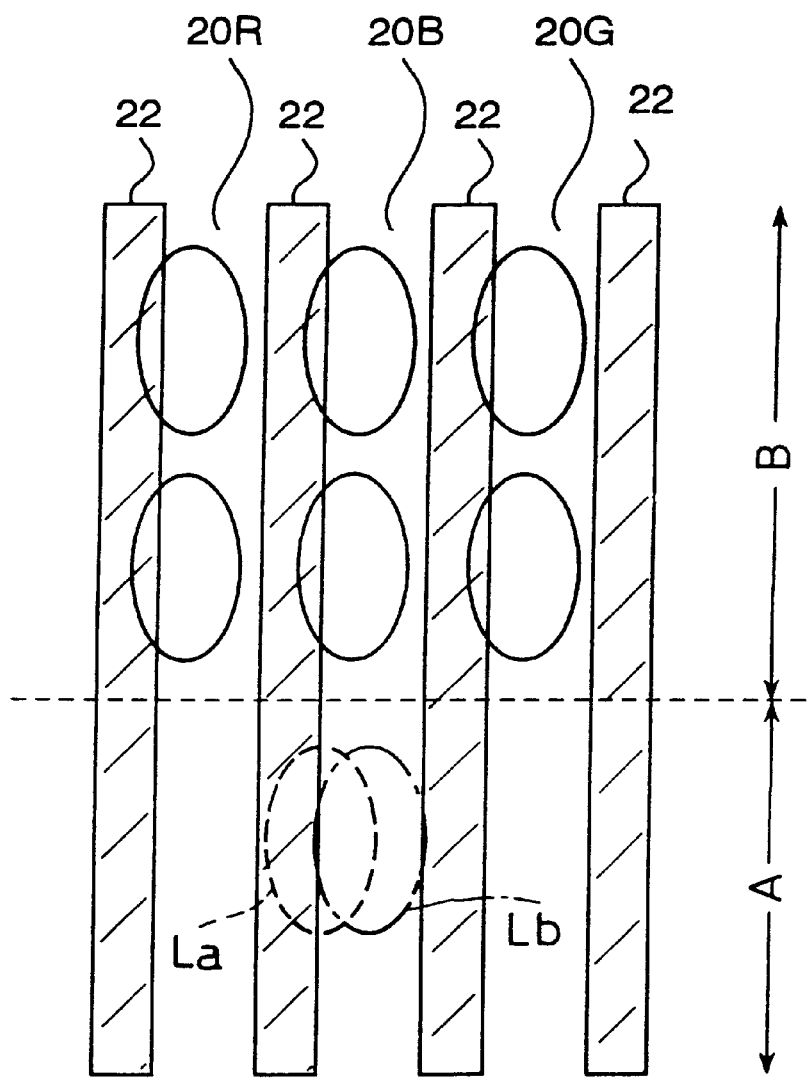
FIG. 3 is a drawing explaining the principle of detecting the beam irradiation position (when the beam irradiation position on the phosphor stripes has shifted to the left due to some reason) in an image display device according to an embodiment of this invention.
Figure 4:
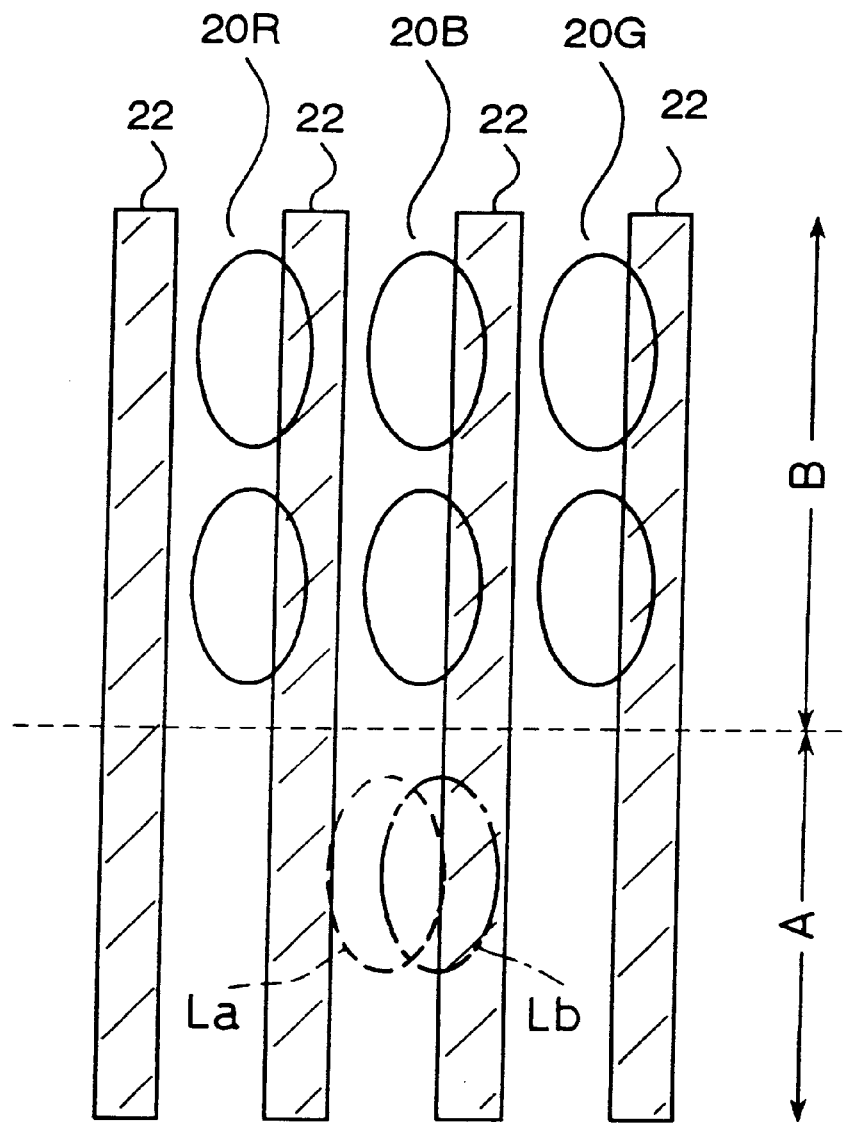
FIG. 4 is a drawing explaining the principle of detecting the beam irradiation position (when the beam irradiation position on the phosphor stripes has shifted to the right due to some reason) in an image display device according to an embodiment of this invention.

Referring to FIGS. 2 to 4, the following explains the principle detecting the relative beam irradiation position with respect to the phosphor stripes. In FIGS. 2 to 4, the configuration wherein phosphor stripes 20R, 20B, 20G of the primary colors (for phosphor cells) R, B, and G are lined up and separated by black guard bands (black matrix) 22, is the same as in the configuration of the conventional image display device. Further, area B, which is shown in FIGS. 2 to 4, shows a regular image display portion, and area A shows the detecting portion for detecting the beam irradiation position. Area A is located in the lower left corner of the image display area, as explained above (see FIG. 1). La indicates the beam spot of the beam for detecting the beam irradiation position in the odd-numbered fields, with an offset to the left side of the original track of the beam. Lb indicates the beam spot of the beam for detecting the beam irradiation position in the even-numbered fields, with an offset to the right side of the original track of the beam. Pa is the emission amount generated by the irradiation of the beam (La) for detecting the beam irradiation position on the phosphor stripes in the odd-numbered fields, and Pb is the emission amount generated by the irradiation of the beam (Lb) for detecting the beam irradiation position on the phosphor stripes in the even-numbered fields.

FIG. 2 shows the state of irradiation of the beam for detecting the beam irradiation position on the phosphor stripes when there is no misalignment in the beam irradiation position on the phosphor stripes. FIG. 3 shows the state of irradiation of the beam for detecting the beam irradiation position on the phosphor stripes when, for some reason, the beam irradiation position on the phosphor stripes has shifted to the left. FIG. 4 shows the state of irradiation on the phosphor stripes of the beam for detecting the beam irradiation position when, for some reason, the beam irradiation position on the phosphor stripes has shifted to the right.

Here, if there is no misalignment in the beam irradiation position on the phosphor stripes, as shown in FIG. 2, the surface area of the portion of the left side of the beam spot La hidden in the black stripe is equal to the surface area of the portion of the right side of the beam spot Lb hidden in the black stripe. Therefore, emission amount Pa and emission amount Pb become equal (Pa=Pb).

On the other hand, if, for some reason, there is a misalignment shifting the beam irradiation position on the phosphor stripes to the left, then, as in FIG. 3, the surface area of the portion of the left side of the beam spot La hidden in the black stripe enlarges, and the surface area of the portion of the right side of the beam spot Lb hidden in the black stripe decreases. Thus, emission amount Pa becomes less than emission amount Pb (Pa<Pb).

Conversely, if, for some reason, there is a misalignment shifting the beam irradiation position on the phosphor stripes to the right, then, as in FIG. 4, the surface area of the portion of the left side of the beam spot La hidden in the black stripe decreases, and the surface area of the portion of the right side of the beam spot Lb hidden in the black stripe enlarges. Thus, emission amount Pa becomes greater than emission amount Pb (Pa>Pb).

In other words, the emission amounts Pa and Pb of the situations shown in FIGS. 2 to 4 are detected, and comparing the emission amounts Pa and Pb, the existence and the direction of a misalignment in the beam irradiation position on the phosphor stripes can be determined. Then, with the feedback of the result of the comparison of the emission amounts Pa and Pb to the horizontal beam track, a misalignment in the beam irradiation position on the phosphor stripes can be corrected. During this time, the above-noted offset component (the offset component in which the polarity reverses for each field to slightly oscillate the beam for detecting a beam irradiation position to the right and left) is maintained.

Further, as mentioned above, if the difference between the emission amounts Pa and Pb is measured, it is also possible to determine the amount of misalignment in the beam irradiation position, but if the feedback loop to the horizontal beam track, where the comparison result of the emission amounts Pa and Pb is fed back, is a closed loop, and if there is a sufficiently large loop gain, it is not necessary to measure the amount of misalignment, and if at least the direction of the misalignment can be detected, Pa=Pb can be attained, or in other words, the misalignment of the beam irradiation position can be made arbitrarily close to zero.

Returning back to FIG. 1, the following is an explanation of the configuration of the feedback loop that controls the beam track corresponding to the detected beam track irradiation position, based on the principle of detecting the relative position of the beam irradiation with respect to the phosphor stripes.

The feedback loop shown in FIG. 1 includes a circuit 31 for generating a beam track offset signal Sw, which reverses its polarity for each field, so that the beam for detecting the beam irradiation position is shifted for equal small amounts to the left and right with respect to the center of the phosphor stripes located at the previous irradiation of the beam; an addition circuit 32 for adding this beam track offset signal Sw to a horizontal deflection signal Sh (which is applied to the horizontal deflection electrode, which is a system for controlling the horizontal direction of the beam track) in accordance with the timing with which the beam for detecting the beam irradiation position is irradiated; a PIN photodiode 33 serving as a system for detecting the emission amount caused by the beam for detecting the beam irradiation position; a sample-and-hold circuit 34a for sampling the emission amount Pa caused by the beam for detecting the beam irradiation position in the odd-numbered fields and holding it for the time of one field or more; a sample-and-hold circuit 34b for sampling the emission amount Pb caused by the beam for detecting the beam irradiation position in the even-numbered fields and holding it for the time of one field or more; a comparator (differential amplification circuit with infinite gain) 35, which compares the emission amount Pa caused by the beam for detecting the beam irradiation position in the odd-numbered fields with the emission amount Pb caused by the beam for detecting the beam irradiation position in the even-numbered fields that are sampled and held with these sample-and-hold circuits 34a and 34b and outputs a beam irradiation position misalignment signal Sd, whose polarity reverses in accordance with the comparison result (and whose absolute value is constant); an integrating circuit 36 for generating the beam position control signal Sc that continuously rises or falls at predetermined speeds, corresponding to the polarity of the output voltage of this comparator 35; an addition circuit 37 for adding this beam position control signal Sc to the horizontal deflection signal Sh (which is applied to the horizontal deflection electrode, which is a system for controlling the horizontal direction of the beam track); a timing circuit 38 for determining the timing for adding the beam track offset signal Sw to the horizontal deflection signal Sh (adjusted to the timing with which the beam for detecting the beam irradiation position is irradiated), and the sampling timing of the sample-and-hold circuits 34a and 34b; and a horizontal deflection electrode driving circuit 39 for amplifying to a predetermined level the horizontal deflection signal Sh to which the beam track offset signal Sw and the beam position control signal Sc have been superimposed, and driving the horizontal deflection electrode 6.

The following is an explanation of the function of this feedback loop (which controls the beam track in response to the detection result of the eam irradiation position), with reference to FIGS. 2 to 4, in addition to FIG. 1. In FIG. 1, by adding the beam track offset signal Sw generated by the circuit 31 for generating a beam track offset signal to the horizontal deflection signal Sh, the irradiation on the phosphor stripes of the beam for detecting the beam irradiation position results in the situation shown in FIGS. 2 to 4, but in the following, it is assumed that the beam irradiation position on the phosphor stripes for some reason has shifted to the left, resulting in the situation shown in FIG. 3.

In this situation, the relation between the emission amount Pa caused by the beam for detecting the beam irradiation position in the odd-numbered fields and the emission amount Pb caused by the beam for detecting the beam irradiation position in the even-numbered fields is such that the emission amount Pa becomes smaller than the emission amount Pb (Pa<Pb). Therefore, the beam irradiation position misalignment signal Sd that is output by the comparator 35 has positive polarity, and the beam position control signal Sc that is output by the integrating circuit 36 starts to rise.

If the structural elements for the feedback are connected in a manner that the beam track is shifted to the right when the polarity of the beam irradiation position misalignment signal Sd changes to plus, the beam irradiation position on the phosphor stripes begins to shift to the right, following the increase of the beam position control signal Sc. This shift continues to the moment when the polarity of the beam irradiation position misalignment signal Sd changes from positive to negative, or in other words, the moment when the beam irradiation position on the phosphor stripes changes from misalignment to the left, passing the center position of the phosphor stripes, to misalignment to the right. Therefore, the beam irradiation position that was misaligned to the left with regard to the phosphor stripes shifts to the right, and finally converges on the center of the phosphor stripes, as shown in FIG. 2. Further, if the beam irradiation position on the phosphor stripes is misaligned to the right (see FIG. 4), the beam irradiation position misalignment signal Sd output by the comparator 35 becomes negative, and since the beam position control signal Sc output by the integrating circuit 36 starts to fall, the beam irradiation position shifts to the left and finally converges on the center of the phosphor stripes, as shown in FIG. 2.

In the configuration of this embodiment, the error detection, that is, the comparison of the emission amounts Pa and Pb of the beams for detecting the beam irradiation positions, is performed discretely using the sample-and-hold circuits 34a and 34b, and since there is no function of holding the control output, that is, the beam position control signal Sc output by the integrating circuit 36, the output of the integrating circuit 36 does not stop, and keeps rising or falling. Thus, even when the beam irradiation position has converged on the center of the phosphor stripes, strictly speaking, the beam irradiation position still oscillates slightly to the left and right. The amplitude of this oscillation depends on the sampling cycle with which the sample-and-hold circuits 34a and 34b sample the emission amount of the beam for detecting the beam irradiation position, and the speed with which the beam moves over the screen, which depends, for example, on the time constant of the integrating circuit 36, the gain of the horizontal deflection electrode driving circuit 39, and the deflection sensitivity of the horizontal deflection electrode 6.

For example, if the field period is $\frac{1}{60}$ seconds, which means that the comparative period of the emission amounts Pa and Pb of the beam for detecting the beam irradiation position is $\frac{1}{30}$ seconds, and if the time constant of the integrating circuit is set to a value that the beam moving speed on the screen is such that the beam moves a distance corresponding to the width of the phosphor stripes in ten seconds, then the amplitude becomes $\frac{1}{300}$ of the width of the phosphor stripes, which is practically no problem. Further, it goes without saying that if a hold circuit is arranged between the integrating circuit 36 and the addition circuit 37, and holds the beam position control signal Sc for two field periods, even such small oscillations in the beam irradiation position can be cancelled completely. Therefore, depending on circumstances, it is preferable that a hold circuit is arranged between the integrating circuit 36 and the addition circuit 37, which holds the beam position control signal Sc for two field periods.

Thus, with the image display device according to this embodiment, the beam irradiation position on the phosphor stripes (of a certain phosphor cell) is slightly oscillated to the left and right with respect to the center of the phosphor stripe by adding the beam track offset signal Sw, which is generated by the circuit 31 for generating a beam track offset signal, to the horizontal deflection signal Sh, thereby applying a certain offset to the beam track in the beam irradiation position detection portion A. Further, detecting and comparing the emission amounts Pa and Pb generated by irradiating this beam on the phosphor stripes, it is possible to determine the existence and the direction of a misalignment in the beam irradiation position on the phosphor stripes. Further, by sending the comparison result to the feedback loop, which includes the sample-and-hold circuits 34a and 34b, the comparator 35, the integrating circuit 36, the addition circuit 37 and the driving circuit 39 for the horizontal deflection electrode etc., and feeding back this result to the horizontal deflection electrode 6, which is a system for controlling the beam track, the beam irradiation position can be converged onto the center of the phosphor stripes.

This embodiment has been explained for the case that the beam for detecting the beam irradiation position is arranged in the lower left corner of the image display area, but the present invention is not limited to this configuration. For example, it is also possible to arrange the beam for detecting the beam irradiation position at another position such as the lower right corner or the upper right corner of the image display area.

Furthermore, this embodiment has been explained for the case that one beam is used as the beam for detecting the beam irradiation position, but the present invention is not limited to this. For example, it is also possible to use two or more beams for detecting the beam irradiation position. Thus, if the beams for detecting the beam irradiation position are arranged at several locations on the image display area, the average beam irradiation position on the entire image display area can be detected with more precision.

Furthermore, this embodiment has been explained for the case in which the phosphor pattern of the image display device is a pattern of vertical stripes, but the present invention is not limited to this configuration. Therefore, the phosphor pattern is not limited to a pattern of vertical stripes, but it can also be a pattern arrangement of phosphor cells of rectangular, circular or other shapes.

Furthermore, this embodiment has been explained for the case of a misalignment in the position of the horizontal beam irradiation, but the present invention is not limited to this configuration. It goes without saying that it is also possible to apply the principle of this invention to misalignments in the position of the vertical beam irradiation.

Furthermore, this embodiment has been explained for the case in which two groups of R, G, and B phosphor stripes are arranged per one horizontal section, but the present invention is not limited to this configuration. For example, it is also possible to have one or three and more groups of R, G and B phosphor stripes per one horizontal section. However, in this case, it is necessary to sequentially apply one or three or more R, G, and B video signals to the control electrode 4, and to synchronize these signals with the horizontal deflection.

Figure 5:
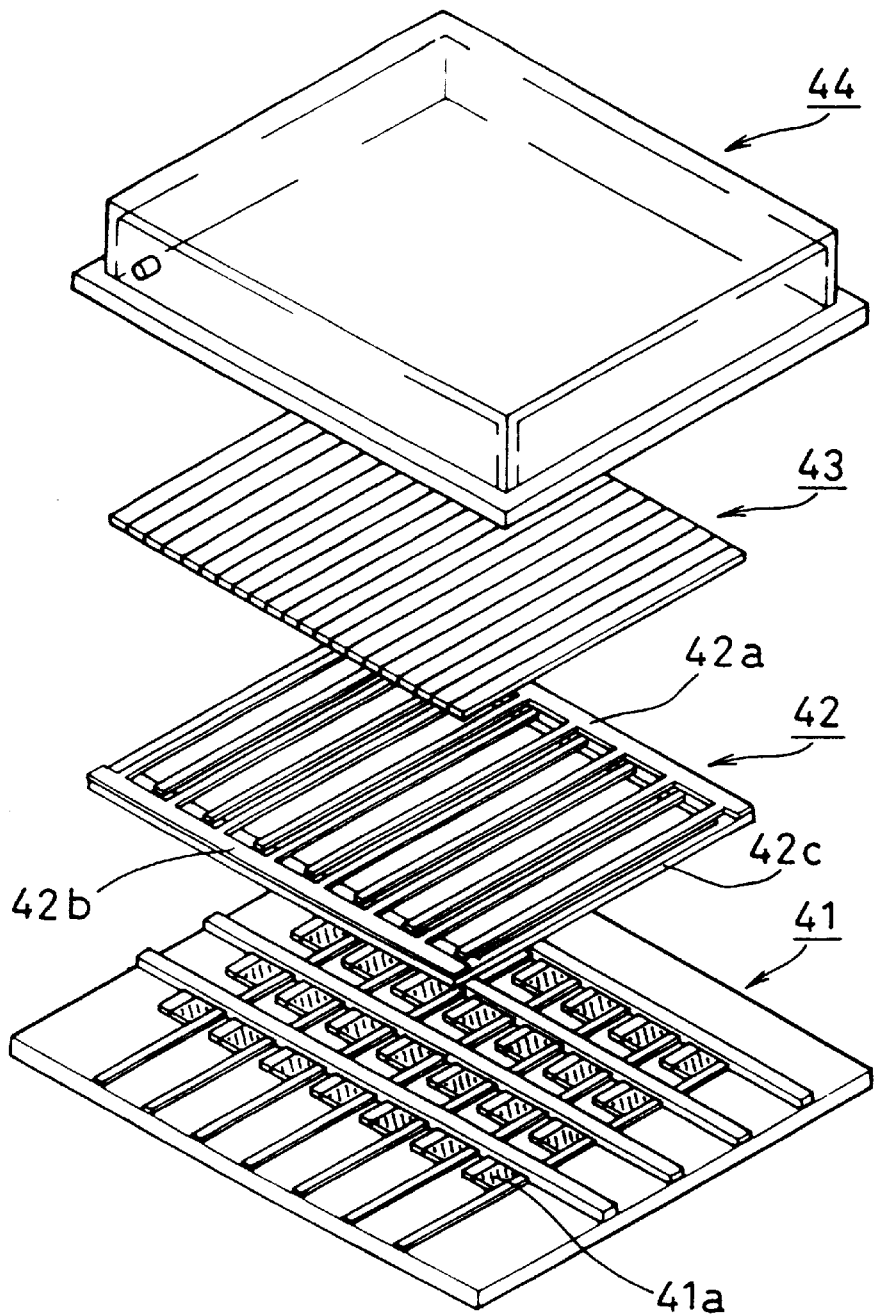
FIG. 5 is a exploded perspective view of an image display device according to another embodiment of this invention.

Furthermore, this embodiment has been explained for an image display device, where electron beams emitted from an electron emission source including a rear electrode 1, a linear electrode group 2, a beam extractor electrode 3 and a control electrode 4 are focussed and deflected with a focussing electrode 5, a horizontal deflection electrode 6, and a vertical deflection electrode 7, and irradiates phosphors on a screen 8 to display an image (see FIG. 1). However, the present invention is not limited to this configuration. For example, it is also possible to apply the present invention to an image display device with the configuration shown in FIG. 5. The image display device shown in FIG. 5 includes an electron emission source 41 that is made by arranging a plurality of electron sources 41a in a matrix; an electrode 42 (having a first comb-shaped electrode 42a and a second comb-toothed electrode 42b on an insulating substrate 42c), whose function is to deflect and focus the electron beam emitted from the electron emission source 41; a phosphor layer 43 that emits light when excited by the electron beam; and a vacuum container 44 that retains the electron emission source 41, the electrode 42 and the phosphor layer 43, and whose inside is maintained under vacuum. In this embodiment, by controlling the horizontal deflection electrode 6, which is a part of the image display device, with a feedback loop as shown in FIG. 1, misalignments of the electron beam in the horizontal direction can be eliminated, so that also in the image display device shown in FIG. 5, it is possible to eliminate the misalignment of the electron beam in either horizontal or vertical direction, or both horizontal and vertical directions, by controlling the electrode 42 with a feedback loop as shown in FIG. 1. In other words, even with the image display device having a configuration as shown in FIG. 5, it is possible to apply the present invention, and to achieve the same results as in the embodiment explained above.

Furthermore, this embodiment has been explained for an image display device, wherein an electron beam is slightly oscillated, the emission amount at two points in the phosphor layer irradiated by the oscillated electron beam is detected and compared, and based on this comparison, the misalignment of the beam is recognized and corrected. However, the resent invention is not limited to this configuration. For example, it is also possible to use a configuration for the image display device where the emission amount of the phosphor layer irradiated by the oscillating beam is detected at only one location, the appropriate emission amount at this location is measured beforehand, the appropriate emission amount and the detected emission amount are compared, and based on this comparison, the misalignment of the electron beam is recognized and corrected.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

INDUSTRIAL APPLICABILITY

The present invention prevents misalignments between a group of flat electrodes and the screen, caused by thermal expansion of structural elements during operation, or misalignments between beam spot positions with respect to phosphor stripes on the screen, caused by beam track deviations between the group of flat electrodes and the screen due to ambient magnetic fields (for example the earth's magnetism at that location), which has been a problem in the prior art, by providing a system for comparing an emission amount of a phosphor cell when a certain offset is applied to a beam track to shift the position of a beam irradiation on a certain phosphor cell (here, a phosphor stripe) with respect to the center of the phosphor cell with the emission amount of the phosphor cell when an offset is applied that is opposite to that beam track offset, by providing a means for feeding back the comparison result to an electron beam track controlling system, and by making the beam irradiation position onto the phosphor cells of the screen controllable by feedback. As a result, deterioration in image quality such as color misalignments caused by such misalignments can be eliminated.

Therefore, according to the invention, the misalignment in the beam spot position with respect to the phosphor stripes on the screen caused for various reasons can be eliminated, and it is possible to obtain an image display device in which a deterioration of the image quality such as color misalignments, etc. does not occur.

The image display device of this invention can be used in a broad range of color television receivers and terminal displays for computers, etc.

What is claimed is:

1. An image display device comprising:
  an emission source for electron beams;
  a display screen having a phosphor layer, wherein phosphors are formed in a certain pattern and separated by a black matrix;
  an electron beam track controlling system, said electron beam track controlling system having the function to selectively irradiate said electron beams onto predetermined positions of said phosphor layer;
  a system for applying a defined offset to the electron beam track with respect to the phosphor layer at a certain position;
  a system for detecting an emission amount of said phosphor layer at the certain position generated by said offset electron beam;
  a system for recognizing a misalignment of said electron beams at an incident position, based on said emission amount;
  a system for correcting misalignment of said electron beams at the incident position by feedback of said misalignment at the incident position to said electron beam track controlling system.

2. The image display device according to claim 1, wherein the system for recognizing a misalignment at an incident position of said electron beams compares (i) an emission amount of the phosphor layer at a position that is defined by applying a certain offset to an electron beam track with respect to a center of the phosphor layer at a certain position, with (ii) an emission amount of the phosphor layer at a position that is defined by applying another offset that is opposite to the certain offset of said electron beam track with respect to the center of said phosphor layer.

3. The image display device according to claim 1, wherein the system for recognizing a misalignment at an incident position of an electron beam compares (i) an emission amount of the phosphor layer at a position that is defined by applying a certain offset to an electron beam track with respect to a center of the phosphor layer at a certain position, with (ii) an appropriate emission amount of the phosphor layer at that position.

4. The image display device according to claim 1, wherein said system for detecting the emission amount of the phosphor layer uses a PIN photodiode.

5. The image display device according to claim 2, wherein said system for detecting the emission amount of the phosphor layer uses a PIN photodiode.

6. The image display device according to claim 3, wherein said system for detecting the emission amount of the phosphor layer uses a PIN photodiode.

* * * * *